United States Patent [19]
Webb

[11] 4,452,427
[45] Jun. 5, 1984

[54] VALVE

[75] Inventor: John W. M. Webb, Rotherham, England

[73] Assignee: Bestobell (U.K.) Ltd., Lough Berks, England

[21] Appl. No.: 279,730

[22] Filed: Jul. 2, 1981

[30] Foreign Application Priority Data

Jul. 3, 1980 [GB] United Kingdom ................ 8021857

[51] Int. Cl.³ ............................................. F16K 31/44
[52] U.S. Cl. .................................... 251/366; 251/214; 251/224; 29/157.1 R
[58] Field of Search ............... 251/214, 230, 216, 221, 251/366, 224; 29/157.1 R, 434

[56] References Cited

U.S. PATENT DOCUMENTS

| | | | |
|---|---|---|---|
| 1,039,059 | 9/1912 | Howard et al. | 251/221 |
| 1,667,203 | 4/1928 | Harris | 251/221 |
| 3,404,865 | 10/1968 | Nelson | 251/214 |
| 3,559,950 | 2/1971 | Nelson | 251/214 |
| 3,674,169 | 7/1972 | Miller | 220/4 R |

FOREIGN PATENT DOCUMENTS 41046 10/1932 France .

*Primary Examiner*—A. Michael Chambers
*Attorney, Agent, or Firm*—Arnold, White & Durkee

[57] ABSTRACT

A valve housing has a valve seat surrounding a fluid passageway, a valve closure member cooperating with the valve seat to close the passageway. A valve actuating spindle for controlling the position of the valve closure member extends through a tubular part of the valve housing, the end of the tubular part remote from the valve seat forming itself a housing for a gland seal. The wall of the tubular part at the inner end of the gland housing is displaced radially inwardly to form, within the tubular part, an annular constriction which surrounds the spindle with a clearance and which forms an abutment towards which an annular packing within the gland housing is urged by a gland fitted to the outer end of the gland housing, to seal the spindle to the valve housing.

9 Claims, 1 Drawing Figure

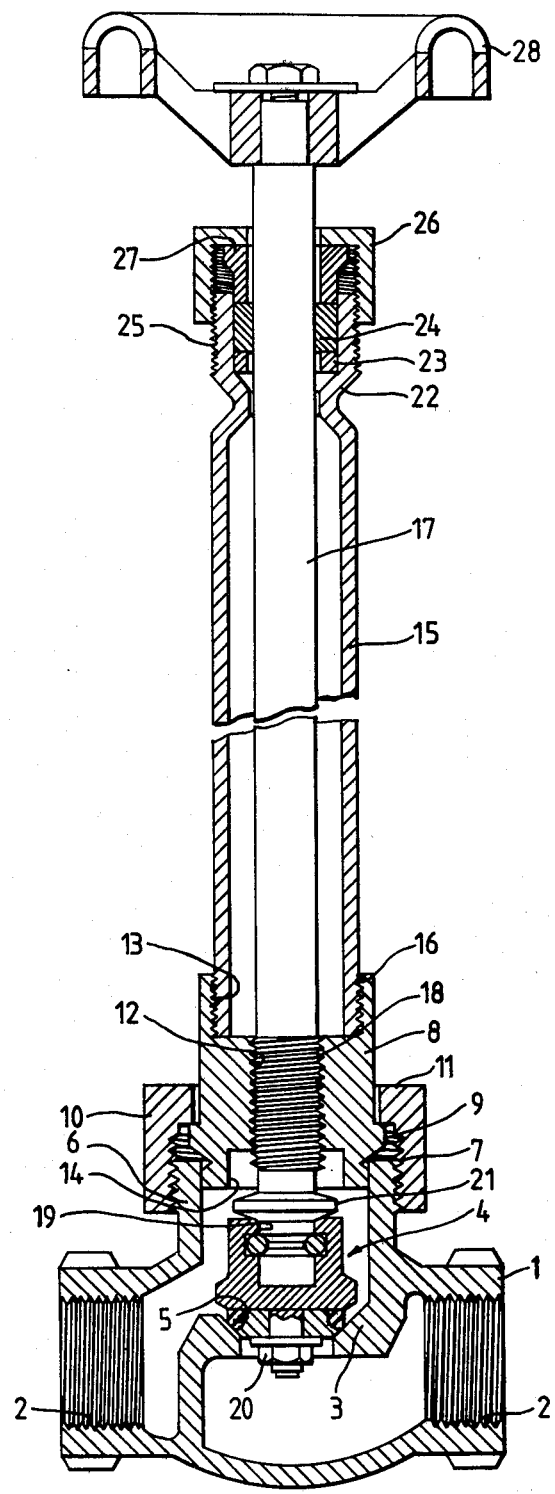

VALVE

The invention relates to valves of the kind comprising a valve housing having a valve seat surrounding a fluid passageway; a valve closure member cooperating with the valve seat to close the passageway; a valve actuating spindle supported by the valve housing for controlling the position of the valve closure member; and a gland seal which seals the spindle to the housing. Such a valve is hereinafter referred to as of the kind described.

In cryogenic valves, if the gland seal is exposed to cold gas or liquid the seal packing is liable to freeze and therefore cause leakage. In the past, this problem has been alleviated by providing the gland seal at a point some distance from the fluid passageway and welding, brazing or silver soldering a separate gland housing on the end of a tubular part of the valve housing through which the valve actuating spindle extends away from the closure member. However, this is expensive and the joint between the gland housing and the end of the tubular part must be carefully made to avoid leakage.

In accordance with the present invention, in a valve of the kind described, the valve actuating spindle extends away from the closure member through a tubular part of the valve housing; the end of the tubular part remote from the valve seat forming itself a housing for the gland seal; and the wall of the tubular part at the inner end of the gland housing having been displaced radially inwardly to form, within the tubular part, a constriction spaced from the spindle to form an abutment towards which an annular packing within the gland housing is urged by a gland fitted to the outer end of the gland housing to seal the spindle to the valve housing.

With this construction, the tubular part of the housing adjacent the actuating spindle is itself displaced by, for example, rolling, forging or pressing to form an end of the gland housing. Thus the joint between the gland housing and the tubular part is avoided. This provides a much cheaper construction than the earlier two piece form and also provides a more secure seal.

Preferably, the constriction is annular and surrounds the spindle, and in that case the constriction must have a sufficient diameter to allow the valve actuating spindle to rotate and/or slide within it. The constriction may have a substantially "V"-shaped cross-section or other cross-sections depending on the form of the die used in the rolling, pressing or forging operation.

The tubular part, which may be a length of stainless steel tube united with the other parts of the housing, may be provided at its end nearer the constriction with an external screw thread onto which a gland nut can be screwed. A packing is compressed between the gland and the constriction by screwing the gland nut down onto the tubular housing part.

An example of a valve constructed in accordance with the present invention is illustrated in the accompanying drawing which is a part sectional view.

The valve illustrated in the drawing is a globe valve although it is to be understood that the invention covers other types of valves, for example gate, ball, and butterfly valves. The valve illustrated has a metal housing 1 surrounding a fluid passageway 2. The fluid passageway 2 passes through a circular valve seat 3 with which a valve closure member 4 cooperates to close the fluid passageway 2, as shown in the drawings. The valve seat 3 has a frustoconical shape against which an annular seal 5 abuts when the valve closure member 4 is in the closed position.

An integral spigot part 6 of the housing 1 is externally screw-threaded at 7. A spindle support 8 having an external annular rib 9 rests on the spigot part 6 and is held in position by an internally screw-threaded cap 10 which is screwed on to the spigot 6 and which has a flange 11 abutting against the part of the rib 9 remote from the spigot 6.

The spindle support 8 has an internally screw-threaded bore 12 and counterbores 13, 14 formed at its upper and lower ends respectively (as seen in the drawing). The counterbore 13 is internally screw-threaded and receives a stainless steel extension tube 15 which is externally screw threaded at 16.

A valve actuating spindle 17 having a widened, externally screw threaded part 18 extends through the extension tube 15, through the bore 12 in which it is screwed, and into the fluid passageway 2. The valve closure member 4 is mounted on the spindle 17 which extends through a bore 19 in the closure member 4 and terminates in an externally screw threaded portion on which is mounted a nut 20. The closure member 4 is held in place by tightening the nut 20 to urge the closure member 4 against an integral annular rib 21 on the spindle 17.

The extension tube 15, at its end remote from the valve seat 3, is displaced to form an annular constriction 22 having a substantially "V"-shaped cross-section. The depth of the "V" is selected so that the constriction 22 defines a diameter just greater than that of the spindle 17. A brass washer 23 rests on the upper surface of the constriction 22, as seen in the drawing, and supports a packing 24. The end of the extension tube 15 adjacent the constriction 22 is externally screw-threaded at 25 and a gland nut 26 is screwed on to the extension tube 15 to urge a gland 27 towards the washer 23 to compress the packing 24. In this way, the spindle 17 is sealed to the extension tube 15.

A conventional handle 28 is mounted nonrotatably on the spindle 15.

When it is desired to open the valve, the spindle 17 is rotated by rotating the handle 28 so that due to the engagement of the externally screw-threaded part 18 and the internally screw-threaded bore 12, the closure member 4 is moved away from the valve seat 3. The counterbore 14 is of a size to receive the annular rib 21.

Although fluid may leak through the bore 12 into the extension tube 15, the leakage path will be curtailed by the sealing action of the packing 24 which will effectively prevent leakage to the atmosphere.

I claim:

1. A valve comprising a valve housing defining a fluid passageway, said housing having a valve seat surrounding said fluid passageway; a valve closure member cooperating with said valve seat to close said passageway; a valve actuating spindle supported by said valve housing for controlling the position of said valve closure member, said valve housing having a tubular part through which said valve actuating spindle extends away from said closure member; a gland seal, comprising an annular packing and a gland, which seals said spindle to said housing; and a gland seal housing, wherein said tubular part of said valve housing has first and second ends, said first end being relatively nearer to said valve seat than said second end, said gland seal housing being defined by said second end, said second end of said tubular part having a wall part which is displaced radially inwardly to form, within said tubular part, a constriction spaced from said spindle, said constriction defining an abutment towards which said annular packing within said gland housing is urged by said gland fitted to said gland housing, and wherein the thickness of the wall of said tubular part of said valve housing is uniform throughout its length.

2. A valve according to claim 1, wherein said constriction is annular and surrounds said spindle.

3. A valve according to claim 2, wherein said constriction has a substantially "V"-shaped cross-section.

4. A valve according to any of claims 1 to 3, wherein an external screw-thread is provided at said second end of said tubular part; the valve further comprising a gland nut which may be screwed onto said external screw-thread.

5. A valve according to claim 1, wherein said tubular part of said valve housing is made from stainless steel.

6. A valve according to claim 1, wherein said constriction has been displaced radially inwardly by the action of a die.

7. A method of constructing a valve, the method comprising: providing a valve housing defining a fluid passageway, said housing having a valve seat surrounding said fluid passageway; providing a valve closure member, cooperating with said valve seat to close said passageway; providing a valve actuating spindle supported by said valve housing controlling the position of said valve closure member, said valve housing having a tubular part through which said valve actuating spindle extends away from said closure member, wherein said tubular part has first and second ends, said first end being relatively nearer to said valve seat then said second end; displacing a wall part of said tubular part adjacent to said second end inwardly with a die to form, within said tubular part, a constriction space from said spindle; providing an annular packing and a gland in said second end of said tubular part and urging said annular packing towards an abutment defined by said constriction whereby said spindle is sealed to said tubular part.

8. A method of constructing a valve, comprising:
providing a valve housing, said housing defining a fluid passageway and having a valve seat surrounding said fluid passageway, said housing also having a tubular portion, said tubular portion having first and second ends, said first end being relatively nearer to said valve seat than said second end;

providing a valve closure member cooperatively conformed with said valve seat to close said passageway;

providing a valve actuating spindle extending through said tubular portion of said valve housing and supported by said valve housing, said valve actuating spindle for controlling the position of said valve closure member;

displacing a wall part of said tubular portion proximate said second end inwardly with a die to constrict said tubular portion relative to said spindle and to form an abutment in the annulus between said spindle and said housing; and providing an annular packing and gland in said second end of said tubular portion and urging said annular packing towards said abutment defined by said constriction to seal between said spindle and said tubular portion.

9. A method of constructing a valve, comprising:
forming a valve housing, said housing defining a fluid passageway and having a valve seat surrounding said fluid passageway, said housing also having a tubular portion, said tubular portion having first and second ends, said first end being relatively nearer to said valve seat than said second end;

displacing a wall part of said tubular portion proximate said second end inwardly with a die to constrict said tubular portion and form an abutment within said tubular portion;

forming a valve closure member cooperatively conformed with said valve seat to close said passageway;

extending a valve actuating spindle through said tubular portion of said valve housing for controlling the position of said valve closure member, said spindle supported by said valve housing;

placing an annular packing and gland in said second end of said tubular portion; and urging said annular packing towards said abutment formed by said constriction to seal between said spindle and said tubular spindle.

* * * * *